Dec. 25, 1962 J. M. JANICKE 3,070,731
MAGNET CHARGER

Filed March 3, 1959 3 Sheets-Sheet 1

JACK M. JANICKE
INVENTOR.

BY
Rudolph J. Junick
ATTORNEY

Dec. 25, 1962
J. M. JANICKE
3,070,731
MAGNET CHARGER
Filed March 3, 1959
3 Sheets-Sheet 2
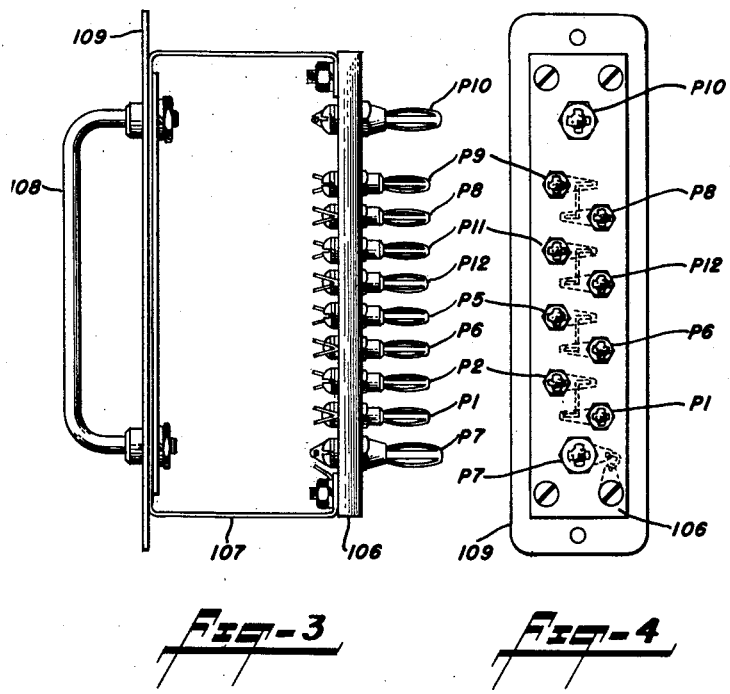
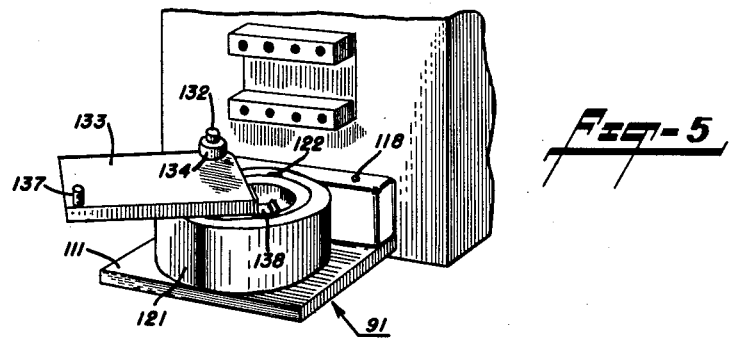
JACK M. JANICKE
INVENTOR.
BY
ATTORNEY Dec. 25, 1962     J. M. JANICKE     3,070,731
MAGNET CHARGER Filed March 3, 1959     3 Sheets-Sheet 3

JACK M. JANICKE
INVENTOR.

BY
Rudolph J. Janick.
ATTORNEY

United States Patent Office 3,070,731
Patented Dec. 25, 1962

3,070,731
MAGNET CHARGER
Jack M. Janicke, Butler, N.J., assignor to Radio Frequency Laboratories, Inc., Boonton, N.J., a corporation of New Jersey
Filed Mar. 3, 1959, Ser. No. 796,869
4 Claims. (Cl. 317—203)

This invention relates to a magnet charger and more particularly to a magnetizer of the impulse or capacitor type.

Capacitor discharge or impulse type of permanent magnet magnetizers are used for magnetizing magnet materials of various shapes and sizes. Ordinarily, electrical energy is stored in a capacitor, or bank of capacitors, and discharged unidirectionally through a pulse, or charging, transformer or through a wire-wound fixture. The pulse transformer includes a multi-turn primary and a single turn secondary. High peak currents are developed in the single turn secondary winding whereupon a large magnetizing flux surrounds the same. The permanent magnet material to be magnetized is placed adjacent to the secondary winding, and is thereby magnetized when the electrical energy is discharged through the pulse transformer. In order to utilize the entire flux change of the pulse transformer for a unidirectional pulse therethrough, a bias curent supply is provided to bias the transformer magnetically in the opposite direction from that of the pulse before each charging operation.

The wire-wound fixture, mentioned above, and comprising, essentially, a single winding transformer with the central core removed therefrom, may be used in place of the pulse transformer. With the wire-wound fixture, the permanent magnet material to be charged is placed within the single winding whereupon almost all of the flux created passes therethrough to charge the same. In prior art arrangements, the pulse, or charging, transformer is removably mounted in the magnet charger construction, and is interchangeable with the wire-wound fixture to provide means whereby magnets of various types may be charged. In the magnet charger of my invention, novel apparatus and circuitry is utilized in the construction thereof whereby the wire-wound fixture may be attached to the magnet charger without the removal of the pulse transformer therefrom. Further, novel interlock switch arrangements are included in the construction of the magnet charger and the wire-wound fixture as a safety precaution.

An object of this invention is the provision of an impulse type magnet charger having a pulse transformer in the output circuit thereof, and a wire wound fixture adapted for connection to the magnet charger in a manner whereby the pulse transformer may be disconnected from the magnet charger circuitry without removing the same from the magnet charger.

An object of this invention is the provision of a wire wound fixture for a magnet charger which fixture includes a novel interlock switch in the construction thereof to prevent a magnetizing pulse from being developed therein when the fixture is not in a safe operating position.

An object of this invention is the provision of a magnet charger comprising a pulse transformer connected to the output circuit thereof through terminals on a removable plug-in panel, and a wire wound fixture interchangeable with the said plug-in panel, the pulse transformer being disconnected from the output circuit when the wire wound fixture is attached to the magnet charger.

These and other objects and advantages will become apparent from the following description when taken with the accompaying drawings. It will be understood that the drawings are for purposes of illustration and are not to be construed as defining the scope or limits of the invention, reference being had for the latter purposes to the appended claims.

In the drawings wherein like reference characters denote like parts in the several views:

FIGURE 3 is a top view of the plug-in interlock panel removed from the magnet charger;

FIGURE 4 is a rear view of the plug-in interlock panel shown in FIGURE 3;

FIGURE 5 is a fragmentary front perspective view of the magnet charger showing the wire-wound fixture plugged therein;

Figures 1, 2:
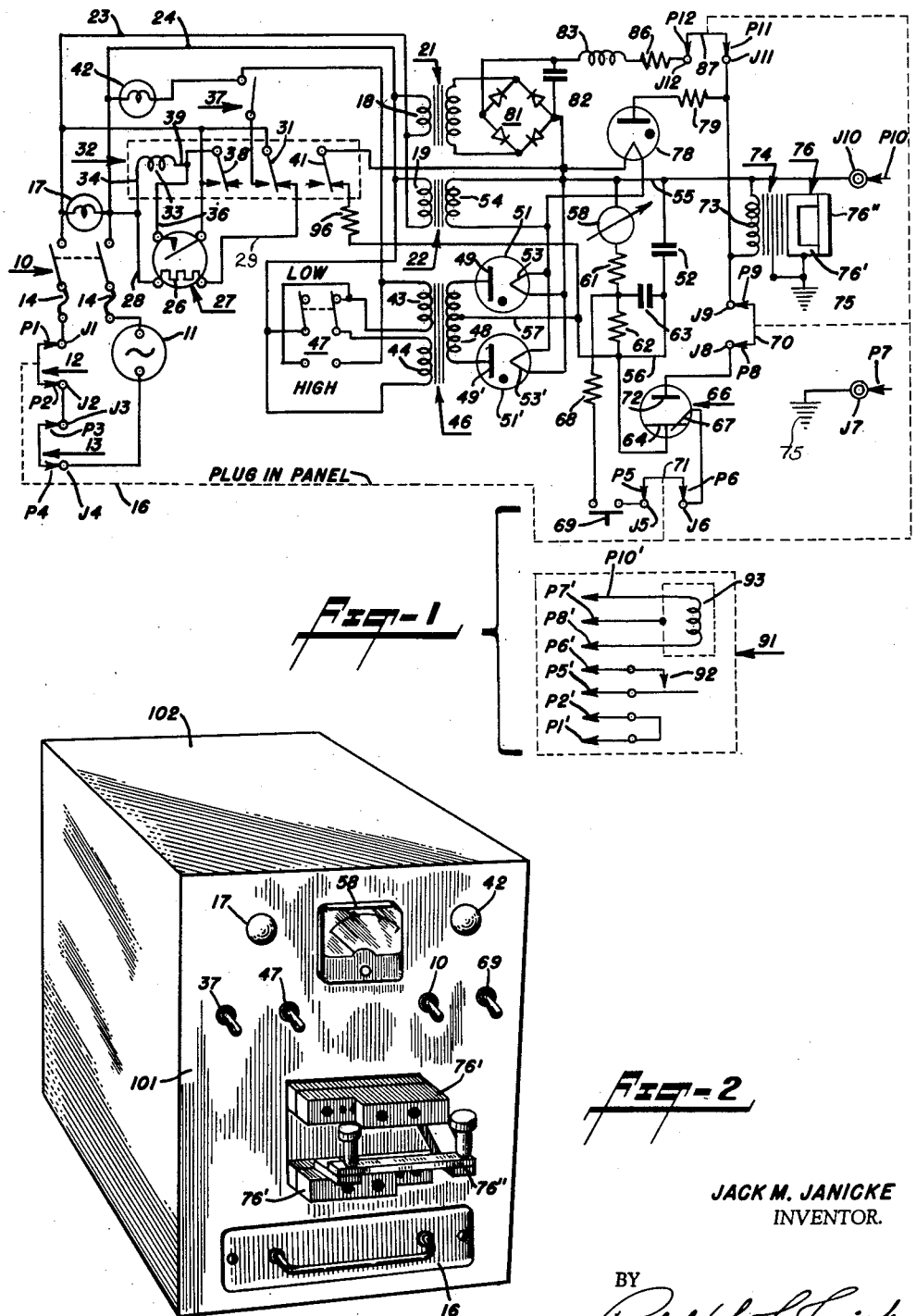
FIGURE 1 is a schematic circuit diagram of my magnet charger, including the removable plug-in wire wound fixture.
FIGURE 2 is a front perspective view of the magnet charger, shown for use with the pulse transformer.

Reference is first made to the schematic circuit diagram of FIGURE 1 wherein there is shown included in the magnet charger a line switch 10 connected to a suitable alternating current source 11 through a pair of series connected interlock devices 12 and 13, and a pair of fuses 14, 14. The interlock device 12 includes jacks J1 and J2 and associated interconnected plugs P1 and P2, which plugs are mounted on the removable plug-in panel 16, shown as a broken line in FIGURE 1. The interlock device 13 includes jacks J3 and J4 and associated interconnected plugs P3 andw P4, which plugs are mounted on the cabinet which houses the magnet charger circuitry. Thus, it will be understood that if either the magnet charger is removed from the cabinet, or the plug-in panel 16 is unplugged from the magnet charger, power to the line switch 10 is removed.

With the line switch 10 closed, power is supplied to a panel indicator lamp 17 and to the respective primary windings 18 and 19 of a bias supply transformer 21 and filament transformer 22 through lead wires 23, 24. Power from the line switch 10 is also supplied to the heater element 26 of a thermal time delay relay 27 through a lead wire 28 connected to one end of the heater and a lead wire 29 connected to the other end thereof through a movable contact 31 of a control relay 32. About thirty seconds after power is applied to the heater element 26, the contacts of the thermal time delay relay 27 will close thereupon energizing the control winding 33 of the control relay 32 through lead wires 34, 36.

Upon energization of the control relay 32, power is supplied to a charging voltage on-off switch 37 through the movable relay contact 31, and is simultaneously removed from the heater element 26 of the thermal relay 27. A second set of control relay contacts, which includes the movable contact 38, connects the power line to the relay control winding 33 through the lead wire 39, while a third set of contacts which includes the movable contact 41 opens a safety bleeder resistor circuit described in detail below.

When the charging voltage on-off switch 37 is closed, a red panel indicator lamp 42 is energized, and power is supplied to the primary windings 43 and 44 of a high voltage transformer 46 through a high-low switch 47. With the movable contacts of the switch 47 contacting the upper stationary switch contacts, as viewed in FIGURE 1, it will be seen that the transformer primary windings 43 and 44 are connected in series circuit. A parallel connection of the transformer primary winding is obtained when the movable contacts are switched to the lower stationary switch contacts.

The high voltage transformer 46 is provided with a center tapped secondary winding 48, the ends of which winding are connected to the anodes 49, 49' of a pair of high voltage rectifier tubes 51, 51' of the mercury vapor type, or the like. The switch 47, which connects the transformer primary windings 43 and 44 in a series or parallel arrangement, controls the amount of potential supplied to the anodes of the mercury vapor rectifier tubes 51, 51' which rectifiers, in turn, supply a charging potential to an energy storage capacitor 52. The filaments 53, 53' of the rectifier tubes are connected to the secondary winding 54 of the filament transformer 22 which supplies power to the filaments. One end of the energy storage capacitor 52 is connected to the rectifier tube filaments through lead wire 55 while the other end thereof is connected to the center tap on the high voltage transformer secondary winding 48 through lead wires 56 and 57. A series connected meter 58 and multiplier resistors 61 and 62, are connected across the energy storage capacitor 52 whereby the meter indicates the charging voltage level on the capacitor.

The resistors 61 and 62 form a voltage divider network, which network supplies charging current to an ignitron firing capacitor 63 connected across the resistor 62. One end of the capacitor 63 is connected to the cathode 64 of an ignitron 66. While the other end of the capacitor is connected to the ignitor element 67 of the ignitron through a small resistance current limiting resistor 68, a push button switch 69, and an interlock device 71 which includes jacks J5 and J6 and associated interconnected plugs P5 and P6 mounted on the removable plug-in panel 16. The ignitron anode 72 is connected to the jack J8 of an interlock device 70, which includes the jacks J8 and J9 and associated interconnected plugs P8 and P9 mounted on the removable plug-in panel 16. The jack J9 connects to one end of the multi-turn primary winding 73 of the pulse, or changing, transformer designated 74; the other end of the primary winding 73 being directly connected to the storage capacitor 52. The single turn secondary winding 76 of the pulse transformer 74 may comprise a U-shaped fixture 76' with a charging conductor 76" removably secured thereto in any suitable manner. The permanent magnet material to be magnetized is placed adjacent to, or surrounds the charging conductor 76" and is charged when unidirectional electrical energy is discharged through the pulse transformer.

A jack J7 is included in the magnet charger, which jack is connected to the common ground connection, designated 75. The associated plug P7 on the plug-in panel 16 is connected to the frame of the plug-in panel, as seen in FIGURE 4 described below. Another jack J10 is included in the magnet charger and is connected to one side of the energy storage capacitor 52. The associated plug P10 on the plug-in panel is connected to nothing when the magnet charger is used with the pulse transformer 74; the jack J10 being utilized with the plug-in wire-wound fixture only, in a manner described hereinbelow.

As described above, the high voltage transformer 46 is energized when the line switch 10 is closed, the relay 32 energized, and the charging on-off switch 37 closed; the potential at the transformer secondary winding 48 depending upon the position of the high-low switch 47. The storage capacitor 52 is charged through the rectifiers 51, 51', while the ignitron firing capacitor 63 is charged through the voltage divider resistors 61 and 62. When the push button switch 69 is momentarily closed by the operator, the energy stored in the ignitron firing capacitor 63 is discharged through the small current limiting resistor 68, switch 69, interlock device 71 and through the ignitor 67 to the cathode of the ignitron, causing the ignitron to conduct. The ignitron functions as a switch in the discharge path for the energy storage capacitor 52, which path includes the interlock device 70 and pulse transformer primary winding 73. With the charging voltage high-low switch 47 in the high position, peak current of approximately 400 amperes is developed in the primary winding 73 of the pulsing transformer 74. With a transformer turns ratio of 125:1 and an efficiency of about 80 percent, magnetizing current as high as 40,000 peak amperes is developed in the secondary charging circuit, depending upon the amount of resistance in this circuit. A mercury vapor type rectifier 78 is connected across the primary winding 73 of the pulse transformer 74 through a series limiting resistor 79 to prevent a reverse current surge as the initial charging pulse decays. This prevents a reversal of the circuit in the charging conductor which, in turn, prevents the reversal of magnetizing flux thereabout.

In order that the entire flux charge possible in the pulse transformer 74 is available for the charging pulse, a small current is applied to the transformer primary winding following each charging pulse to reverse bias the said transformer. The bias supply comprises the transformer 21 which supplies power to a full-wave bridge rectifier network 81. The output from the rectifier is filtered by a filter network which includes a shunt capacitor 82 and series inductor 83. The filtered direct current output is fed through a current limiting resistor 86 and interlock device 87 (which includes the jacks J11 and J12 and interconnected plugs P11 and P12 which are mounted on the removable plug-in panel 16) to the transformer primary winding 73. A direct current of approximately 0.6 ampere is supplied to the charging transformer primary winding, which current is of opposite polarity to the charging current and, therefore, serves to cancel the residual induction left in the transformer core by the charging current.

Figure 6:
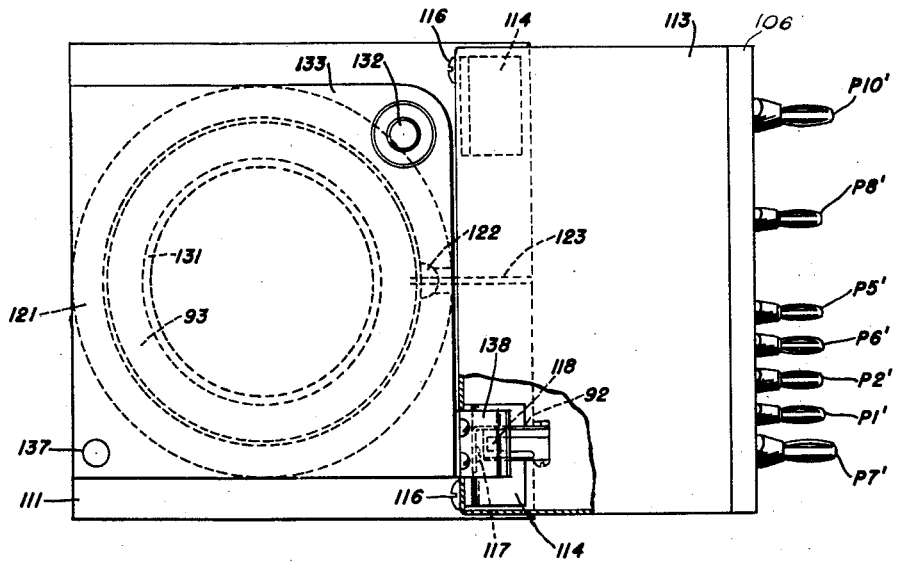
FIGURE 6 is a top view of the wire-wound fixture shown removed from the magnet charger.
Figure 7:
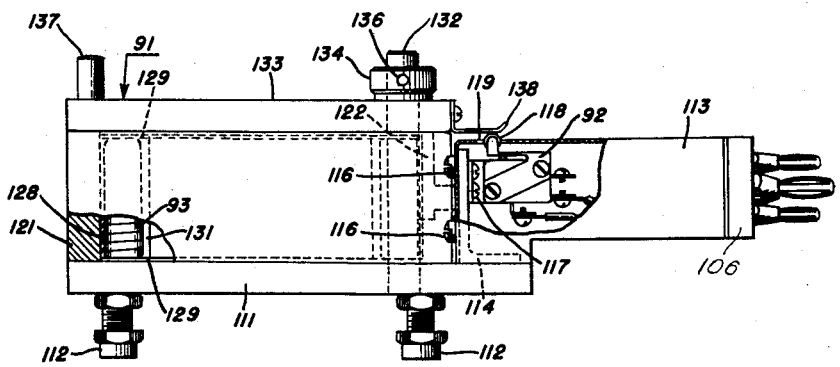
FIGURE 7 is a side view of the wire wound fixture shown in FIGURE 5; parts being broken away for clarity.

The magnet charger so far described, is adapted for charging of magnets through use of the pulse transformer 74. With my novel arrangement, a plug-in wire-wound fixture, designated 91, may be used with the magnet charger, which fixture is of the confined field type. When the wire-wound fixture 91 is to be used, the plug-in panel 16, with the attached plugs P1, P2, P5, P6, P8, P9, P11 and P12, is removed from the magnet charger, and fixture 91 is inserted in place thereof. The fixture includes plugs P1', P2', P5', P6', P7', P8' and P10' which engage the respective jacks J1, J2, J5, J6, J7, J8 and J10 in the magnet charger. The plugs P1' and P2' in the wire wound fixture are interconnected to complete the power input circuit of the magnet charger when the wire wound fixture is plugged into the magnet charger. The plugs P5' and P6' are connected together through a normally open switch 92 on the fixture. It will be noted that with the switch 92 in the ignitor circuit of the ignitron, the ignitron cannot be fired until the switch 92 is closed. The location and operation of the switch is best shown in FIGURES 5, 6 and 7, described in detail below. The plugs P8' and P10' are connected to the ends of the coil 93 of the wire wound fixture, while the plug P7' is connected to the coil housing shown in broken lines in FIGURE 1. Thus, the coil of the wire-wound fixture is connected between the one end of the energy storage capacitor 52 and the anode 72 of the ignitron, in place of the pulse transformer primary winding 73, when the wire-wound fixture is plugged into the magnet charger.

The bias supply and shunt diode 78 are not used when the wire-wound fixture 91 is connected to the charger. The automatic disconnection thereof is accomplished when the plugs P8, P9, P11 and P12 are removed from the associated jacks upon removal of the plug-in panel 16 from the charger. Except for the bias supply and shunt diode, the operation of the magnet charger with the wire wound fixture is the same as with the pulse transformer 74, as described above.

A current discharge path for the energy storage capacitor 52 is provided through a bleeder resistor 96 connected in series with the movable contact 41 of the relay 32 when the relay is in a deenergized position as shown. The potentially dangerous high voltage charge is bled off the capacitor 52 when the relay 32 is deenergized and the equipment is shut down. With the relay 32 energized, the contact 41 is actuated to remove the bleeder resistor from the active circuit.

Reference is now made to FIGURE 2 of the drawings wherein there is shown a front perspective view of the magnet charger with the plug-in interlock panel 16 plugged therein. The on-off and charging switches are located on the front panel 101 of the magnet charger, together with the meter 58 and indicator lights 17 and 42. The interconnected plugs P3 and P4 of the interlock device 13, shown in FIGURE 1, but not shown in FIGURE 2, are suitably secured to the magnet charger housing 102 of FIGURE 2, while the jacks J3 and J4 are suitably secured to the chassis of the magnet charger within the housing 102 such that when the housing 102 is removed from the chassis, power to the line switch 10 is also automatically removed.

Reference is now also made to FIGURES 3 and 4 of the drawings wherein top and rear views, respectively, of the plug-in interlock panel 16 is shown, which includes a plug strip 106 of insulating material to which the plugs P1, P2 and P5 to P12 are attached. As seen in FIGURE 4, the respective plugs P1 and P2, P5 and P6, P8 and P9, and P11 and P12 are interconnected by suitable jumpers. The plug strip 106 is suitably secured to a mounting bracket 107, and attached to the front of the mounting bracket is a handle 108 and cover plate 109. As seen in FIGURE 4, the plug P7 is connected to the mounting bracket which comprises a portion of the common ground 75 when plugged into the magnet charger.

With the interlock panel 16 plugged into the magnet charger, as viewed in FIGURE 2, the high intensity field surrounding the single turn secondary inductor 76" of the pulse transformer 74 is used to charge magnet materials of various shapes and configurations. To charge a U-shaped or horseshoe magnet, for example, the magnet is placed on the conductor bar 76" and a suitable soft iron keeper is placed across the air gap of the magnet. The charging switch 69 is momentarily pushed by the operator to a closed position, and the magnet is charged.

For charging rod, bars, and other magnets of similar shape, the plug-in interlock panel 16 is removed from the magnet charger and the wire-wound fixture 91, shown schematically in FIGURE 1 of the drawings, is plugged into the charger in place thereof. Reference is made to FIGURE 5 of the drawings, wherein there is shown a fragmentary front perspective view of the magnet charger with the wire-wound fixture plugged therein. The wire wound fixture is used in place of the plug-in panel 16, making it unnecessary to physically remove the pulse transformer from the magnet charger when the wire-wound fixture is used.

Reference is now also made to FIGURES 6 and 7 of the drawings wherein top plan and side views, respectively, of the wire-wound fixture are shown. The fixture comprises a base plate 111 mounted upon leveling legs 112. A housing 113 is secured to the base plate 111 by means of brackets 114 and screws 116, which housing extends outwardly beyond the base plate edge. A plug strip 106 of the type used on the plug-in panel 16, shown in FIGURES 3 and 4, is suitably secured to the outer end of the housing, to which strip the plugs P1', P2', P5' to P8' and P20' are secured. The switch 92 is mounted on one of the brackets 114 by screws 117 within the housing 113, and a switch control arm 118 attached to the switch extends upwardly through an aperture 119 in the housing top. The switch 92, as seen in the schematic diagram of FIGURE 1, and described above, is connected to the plugs P5' and P6' which contact the jacks J5 and J6, respectively, in the ignitron ignitor circuit of the magnet charger when the wire-wound fixture is plugged into the operative circuit.

A generally hollow cylindrically-shaped shell 121 forms with the base plate 111 a container composed of magnetic material. The shell is secured to said plate as by welding, or other suitable means. Air gaps formed by slots 122 and 123 in the respective shell and base plate, are necessary to prevent the same from acting as single turn, short-circuited, secondary windings in the fixture. The coil 93 of the fixture is mounted within the shell 121 in potting compound 128. Annular end pieces 129, 129 are positioned at the ends of the coil, and a hollow cylindrical core 131 is located within the coil.

A pivot post 132 extends upwardly of the base plate 111 adjacent the shell 121, and a generally square cover 133 of magnetic material is pivotally mounted on the post, the cover being retained on the post by means of a collar 134 secured to the post by a set screw 136. A handle 137 is provided on the cover adjacent the corner diagonally opposite the post whereby the cover is easily rotated to open and closed positions.

An L-shaped plate 138, comprising a switch actuator, is attached to the edge of the cover 133 and cooperates with the switch control arm 118 of the switch 92 when the cover is in a closed position. With the cover in a closed position, the switch is closed, and with the cover open, the switch returns to the normal open position. Since the switch 117 is located in the ignitor circuit of the ignitron, it will be seen that magnetizing pulses are prevented from being developed until the cover is closed. This is a safety precaution providing complete enclosure of the charging coil 93 in use.

In operation of the wire wound fixture, the magnet material to be magnetized is placed within the core, and it is advisable to fill most of any air gap between the magnet material and base plate and cover with soft iron to provide a low reluctance path for the magnetizing force. It is necessary, however, to leave a small gap near the cover to prevent a completely closed magnetic circuit which would cause difficulty when attempting to swing the cover open prior to removing the charged magnet. A section of insulating material of about one-sixteenth inch thickness is preferably placed on top of the magnet material before magnetization to break the closed magnet circuit.

Having now described my invention in detail, in accordance with the patent statutes, various other changes and modifications will suggest themselves to those skilled in this art. It is intended that such changes and modifications shall fall within the spirit and scope of the invention as recited in the following claims.

I claim:

1. A magnet charger adapter for use with a magnet charger to make it suitable for charging non-apertured magnet material as well as that of the horse-shoe and ring type, said charger including an energy storage capacitor having a discharge path which includes a switching device and switch actuating means for actuating the switching device, the said adapter comprising a container of magnetic material having an access opening therein, a cover of magnetic material movable into a closed position over the access opening in the container, a coil mounted in the container and electrically connected to the energy storage capacitor through the switching device, and a switch actuated to a closed condition in the closed position of the cover, the said switch being connected in electrical circuit with the switch actuating means.

2. A magnet charger adapter for use with a magnet charger including an energy storage capacitor having a discharge path which includes a switching device and switch actuating means for actuating the said switching device, the said adapter comprising a magnetic container having an opening therein, an annular coil mounted within the said container, means electrically connecting the coil to the energy storage capacitor through the switching device in the magnet charger, a magnetic cover movable into a closed position over the opening in the magnetic container, a switch mounted on the adapter, switch actuating means secured to the cover and actuating the switch in the closed position of the cover, means connecting the switch in electrical circuit with the switch actuating means whereby the switch actuating means is rendered ineffective to actuate the switching device in the magnet charger when the cover is in an open position.

3. A magnet charger having an output circuit and comprising a removable interlock panel including interconnected terminals, a pulse transformer connected to the output circuit through the interconnected terminals on the interlock panel, whereby apertured magnet material is chargeable, and a removable wire-wound fixture interchangeable with the said interlock panel, the said pulse transformer being disconnected from the magnet charger output circuit when the wire-wound fixture is attached to the magnet charger, whereby non-apertured magnet material is chargeable.

4. A magnet charge having an energy storage capacitor in the output circuit thereof, a removable interlock panel, a pair of interconnected terminals mounted on the interlock panel, a pulse transformer connected to the energy storage capacitor through the interconnected terminals on the interlock panel when the said panel is attached to the magnet charger, and a removable wire-wound fixture interchangeably mounted on the magnet charger with the removable interlock panel, the said pulse transformer being disconnected from, and the said wire wound fixture being connected to, the energy storage capacitor when the wire wound fixture is attached to the magnet charger.

References Cited in the file of this patent

UNITED STATES PATENTS

| | | |
|---|---|---|
| 2,247,745 | Brader | July 1, 1941 |
| 2,764,716 | Minchom | Sept. 25, 1956 |
| 2,786,970 | Connoy | Mar. 26, 2957 |
| 2,871,417 | Connoy | Jan. 27, 1959 |
| 2,880,379 | Stoddart et al. | Mar. 31, 1959 |
| 2,897,417 | MacDonough | July 28, 1959 |
| 2,945,989 | Vogel et al. | July 19, 1960 |

FOREIGN PATENTS

| | | |
|---|---|---|
| 710,738 | Great Britain | June 16, 1954 |

OTHER REFERENCES

Moore: "Impulse Magnetizer for Permanent Magnets," Electronics, August 1955.